United States Patent
Jones et al.

Patent Number: 5,540,883
Date of Patent: Jul. 30, 1996

[54] METHOD OF PRODUCING BEARINGS

[75] Inventors: Peter Jones, Toronto; Keith Buckley-Golder, Oakville, both of Canada

[73] Assignee: Stackpole Limited, Toronto, Canada

[21] Appl. No.: 107,840

[22] Filed: May 31, 1994

[51] Int. Cl.⁶ .................................................. B22F 3/16
[52] U.S. Cl. .......................... 419/28; 75/236; 75/245; 419/6; 419/11; 419/14; 419/23; 419/29; 419/32; 419/38; 419/43; 419/57; 419/58; 419/59
[58] Field of Search .................................. 419/6, 11, 14, 419/23, 28, 29, 32, 38, 43, 57, 58, 59; 75/236, 245

[56] References Cited

U.S. PATENT DOCUMENTS

| | | | |
|---|---|---|---|
| 4,059,879 | 11/1977 | Chmura et al. | 29/148.4 R |
| 4,361,629 | 11/1982 | Mori | 428/553 |
| 4,708,912 | 11/1987 | Huppmann | 428/547 |
| 4,966,626 | 10/1990 | Fujiki et al. | 75/238 |
| 4,976,916 | 12/1990 | Shimomura | 419/25 |
| 5,009,842 | 4/1991 | Hendrickson et al. | 419/28 |
| 5,053,192 | 10/1991 | Merzhanov et al. | 419/10 |
| 5,080,712 | 1/1992 | James et al. | 75/229 |
| 5,082,433 | 1/1992 | Leithner | 419/11 |
| 5,188,659 | 2/1993 | Purnell | 75/246 |
| 5,217,683 | 6/1993 | Causton | 419/38 |
| 5,326,526 | 7/1994 | Ikenoue et al. | 419/38 |
| 5,403,371 | 4/1995 | Engdahl et al. | 75/230 |

Primary Examiner—Donald P. Walsh
Assistant Examiner—Scott T. Bluni
Attorney, Agent, or Firm—Eugene J. A. Gierczak

[57] ABSTRACT

A method of producing bearing surfaces from powder metal blanks comprising: blending carbon and ferro alloys and lubricant with compressible elemental iron powder, pressing the blending mixture to form the powder metal blank, high temperature sintering the blank in a reducing atmosphere, compressing the powder metal blanks so as to produce a densified layer having a bearing surface, and then heat treating the densified layer.

15 Claims, 4 Drawing Sheets

5,540,883

METHOD OF PRODUCING BEARINGS

FIELD OF THE INVENTION

This invention relates to a method or process of producing bearing surfaces from powder metal articles and particularly relates to a method of blending carbon ferro alloys and lubricant with compressible elemental iron powder then pressing the blended mixture to form an article followed by high temperature sintering of the article to produce a high ductility ferro metal blank which is then compressed by roller burnishing tools to produce a densified layer defining a bearing surface followed by heat treatment of the densified layer.

BACKGROUND TO THE INVENTION

Powder metal technology is well known to the persons skilled in the art and generally comprises the formation of metal powders which are compacted and then subjected to an elevated temperature so as to produce a sintered product.

Conventional sintering occurs at a maximum temperature of approximately up to 1,150° C. Historically the upper temperature has been limited to this temperature by sintering equipment availability. Therefore copper and nickel have traditionally been used as alloying additions when sintering has been conducted at conventional temperatures of up to 1,150° C., as their oxides are easily reduced at these temperatures in a generated atmosphere, of relatively high dew point containing $CO$, $CO_2$ and $H_2$. The use of copper and nickel as an alloying material is expensive. Moreover, copper when utilized in combination with carbon as an alloying material and sintered at high temperatures causes dimensional instability and accordingly the use of same in a high temperature sintering process results in a more difficult process to control the dimensional characteristics of the desired product. Manufacturers of metal powders utilized in powder metal technology produce pre-alloyed iron powders which are generally more difficult to compact into complex shapes particularly at higher densities (>7.0 g/cc). Manganese and chromium can be incorporated into pre-alloyed powders provided special manufacturing precautions are taken to minimize the oxygen content, for example, by oil atomization. Notwithstanding this, these powders still have poor compressabilities compared to admixed powders.

Conventional means to increase the strength of powder metal articles use up to 8% nickel, 4% copper and 1.5% molybdenum, in pre-alloyed, partially pre-alloyed, or admixed powders. Furthermore double press double sintering can be used for high performance parts as a means of increasing part density. Conventional elements are expensive and relatively ineffective for generating mechanical properties equivalent to wrought steel products, which commonly use the more effective strengthening alloying elements manganese and chromium.

Moreover, conventional technology as disclosed in U.S. Pat. No. 2,402,120 teach pulverizing material such as mill scale to a very fine sized powder, and thereafter reducing the mill scale powder to iron powder without melting it.

Furthermore, U.S. Pat. No. 2,289,569 relates generally to powder metallurgy and more particularly to a low melting point alloy powder and to the usage of the low melting point alloy powders in the formation of sintered articles.

Yet another process is disclosed in U.S. Pat. No. 2,027,763 which relates to a process of making sintered hard metal and consists essentially of steps connected with the process in the production of hard metal. In particular, U.S. Pat. No. 2,027,763 relates to a process of making sintered hard metal which comprises producing a spray of dry, finely powdered mixture of fusible metals and a readily fusible auxiliary metal under high pressure producing a spray of adhesive agent customary for binding hard metals under high stress, and so directing the sprays that the spray of metallic powder and the spray of adhesive liquid will meet on their way to the molds, or within the latter, whereby the mold will become filled with a compact moist mass of metallic powder and finally completing the hard metallic particle thus formed by sintering. U.S. Pat. No. 4,707,332 teaches a process for manufacturing structural parts from intermetallic phases capable of sintering by means of special additives which serve at the same time as sintering assists and increase the ductility of the finished structural product.

Finally, U.S. Pat. No. 4,464,206 relates to a wrought powder metal process for pre-alloyed powder. In particular, U.S. Pat. No. 4,464,206 teaches a process comprising the steps of communicating substantially non-compatible pre-alloyed metal powders so as to flatten the particles thereof heating the communicated particles of metal powder at an elevated temperature, with the particles adhering and forming a mass during heating, crushing the mass of metal powder, compacting the crushed mass of metal powder, sintering the metal powder and hot working the metal powder into a wrought product.

Moreover, various methods have heretofore been utilized to densify a powder metal article. For example, U.S. Pat. No. 4,059,879 teaches a method for partially densifying a selected surface portion of a sintered pores powder metal element.

Furthermore, U.S. Pat. No. 3,874,049 teaches a method of making a powder metal part having a bearing surface. Finally, U.S. Pat. No. 3,365,770 teaches a method of producing a multi-layer bearing while U.S. Pat. No. 3,183,086 teaches a method of making pores body with imperviously sealed surface.

The processes as described in the prior art above present a relatively less cost effective process to achieve the desired mechanical properties of the sintered product. Furthermore, the method described in the prior art above produce powder metal bearing surfaces which do not have desirable strength or wear resistant characteristics.

It is an object of this invention to provide an improved process for producing powder mutual bearings having improved dynamic strength characteristics and an accurate method to control the manufacture of same.

It is an aspect of this invention to produce a method of producing bearing surfaces from powder metal articles comprising blending carbon and ferro alloys and lubricant with compressible elemental iron powder pressing the blending mixture to form the powder metal article, high temperature sintering the powder metal article in a reducing atmosphere then compressing the powder metal article so as to produce a densified layer having a bearing surface then heat treating the densified layer.

It is another aspect of this invention to provide a method of producing bearings from a compacted and sintered cylindrical article by applying a rolling pressure against the cylindrical blank so as to produce a densified layer defining the bearing and then heat treating the densified layer. In one particular preferred embodiment the compacted and sintered cylindrical blank is comprised of between 0.5 to 2.0% chromium, between 0 to 1.0% molybdenum, and between 0.1 to 0.6% carbon composition with the remainder bearing iron and unavoidable impurities.

It is a further aspect of this invention to provide a powder metal bearing comprising a compacted and sintered article having a compacted surface so as to present a densified layer defining the bearing. In one particular embodiment, the compacted sintered article has a composition of between 0.5 to 2.0% chromium, between 0 to 1.0% molybdenum and between 0.1 to 0.6% carbon composition with the remainder being iron and unavoidable impurities. Furthermore, in one particular embodiment, the powder metal bearing has a densified layer with a thickness of up to 2 millimeters with the density of the layer gradually increasing to approximately 98% at the surface of the bearing.

DESCRIPTION OF DRAWINGS

These and other features and objections of the invention will now be described in relation to the following drawings.

DESCRIPTION OF THE INVENTION

Figure 1:
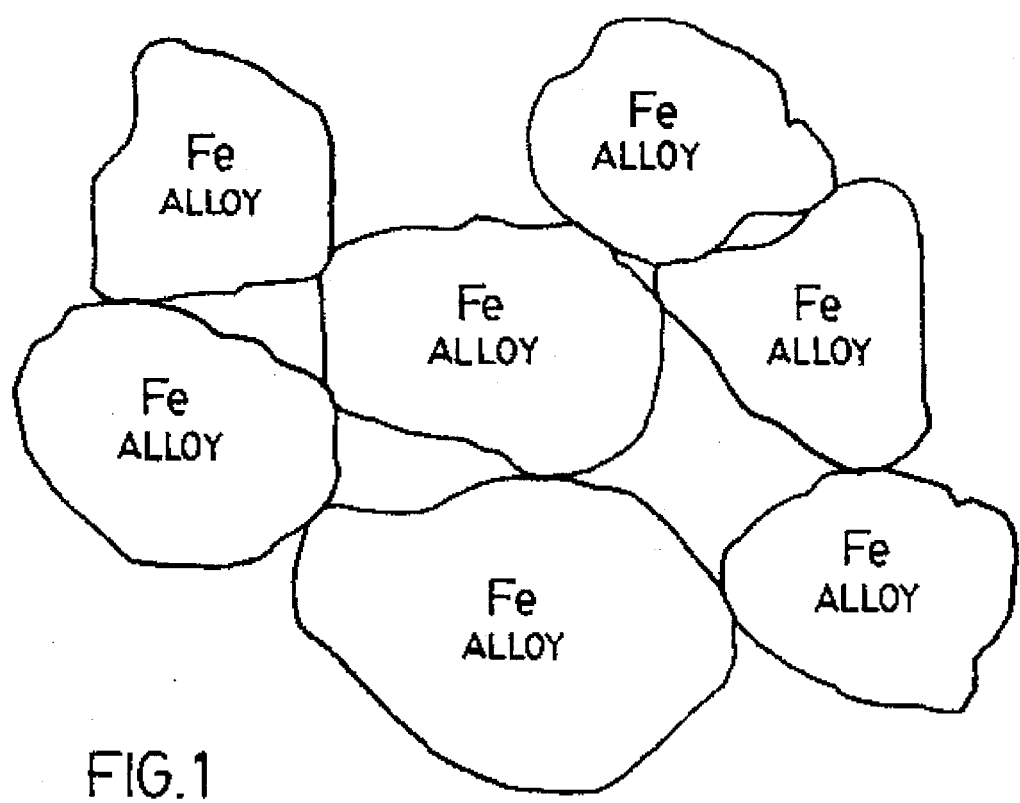
FIG. 1 is a drawing of the prior art mixture of iron alloy.

FIG. 1 is a representative view of a mixture of powder metal utilized in the prior art which consists of particles of ferro alloy in powder metal technology.

In particular, copper and nickel may be used as the alloying materials, particularly if the powder metal is subjected to conventional temperature of up to 1150° C. during the sintering process.

Moreover, other alloying materials such as manganese, chromium, and molybdenum which were alloyed with iron could be added by means of a master alloy although such elements were tied together in the prior art. For example a common master alloy consists of 22% of manganese, 22% of chromium and 22% of molybdenum, with the balance consisting of iron and carbon. The utilization of the elements in a tied form made it difficult to tailor the mechanical properties of the final sintered product for specific applications. Also the cost of the master alloy is very high and uneconomic.

By utilizing ferro alloys which consist of ferro manganese, or ferro chromium or ferro molybdenum or ferro vanadium, separately from one another rather than utilizing a ferro alloy which consists of a combination of iron, with manganese, chromium, molybdenum or vanadium tied together a more accurate control on the desired properties of the finished product may be accomplished so as to produce a method having more flexibility than accomplished by the prior art as well as being more cost effective.

Figure 2:
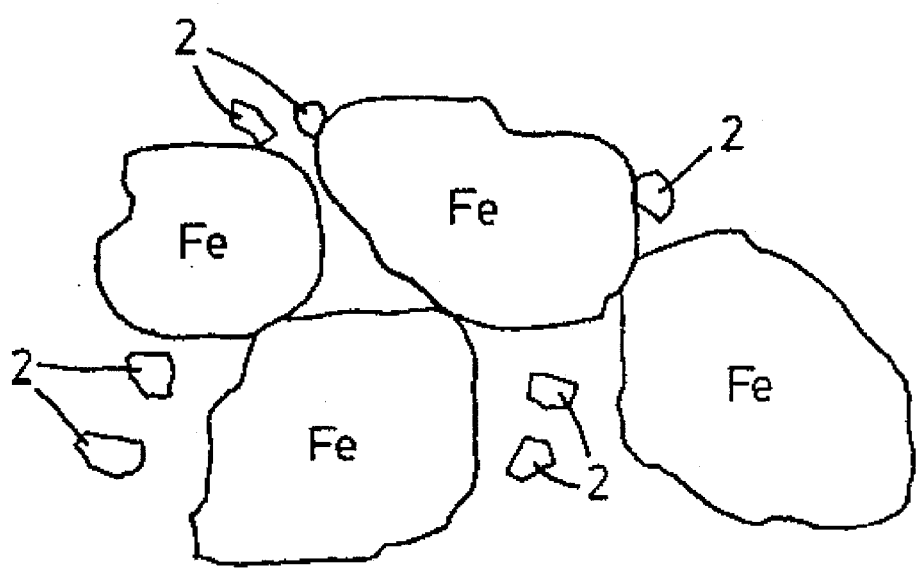
FIG. 2 is a drawing of a mixture of elemental iron, and ferro alloy.

FIG. 2 is a representative drawing of the mixture of elemental iron and ferro alloy to be described herein, which consists of iron particles, Fe having a mixture of ferro alloys 2.

The ferro alloy 2 can be selected from the following groups:

| Name | Symbol | Approx. % of Alloy Element |
| --- | --- | --- |
| ferro manganese | FeMn | 78% |
| ferro chromium | FeCr | 65% |
| ferro molybdenum | FeMo | 71% |
| ferro vanadium | FeVa | 75% |
| ferro silicon | FeSi | 75% |
| ferro boron | FeB | 17.5% |

The ferro alloys available in the market place may also contain carbon as well as unavoidable impurities which is well known to those people skilled in the art.

Chromium molybdenum and vanadium are added to increase the strength of the finished product particularly when the product is subjected to heat treatment after sintering. Moreover, manganese is added to increase the strength of the finished product, particularly if one is not heat treating the product after the sintering stage. The reason for this is manganese is a powerful ferrite strengthener (up to 4 times more effective than nickel).

Figure 3:
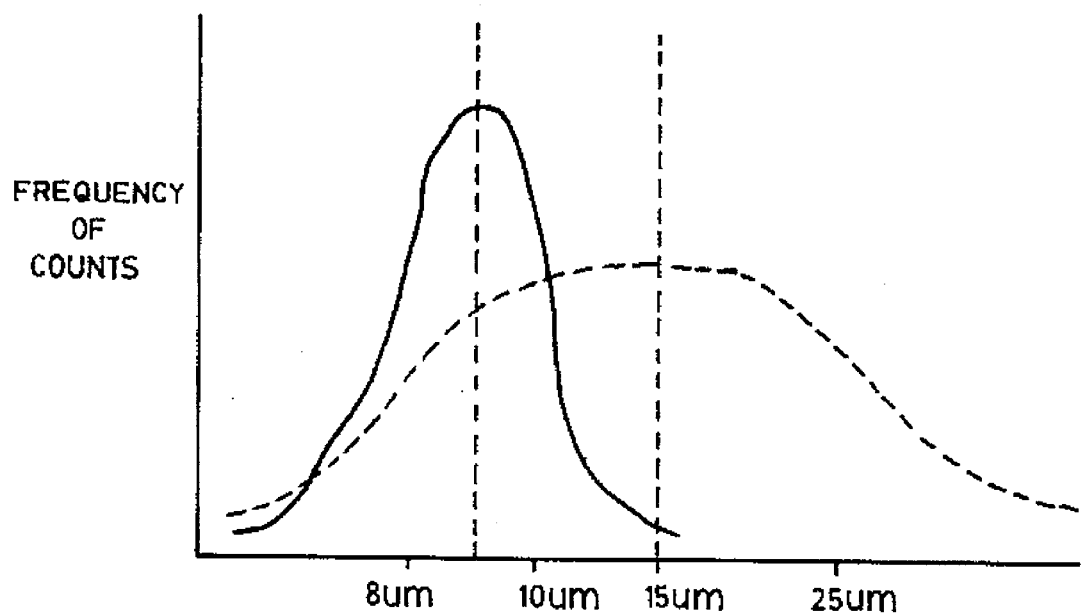
FIG. 3 is a graph showing the distribution of particle size.

Particularly good results are achieved in the method described herein by grinding the ferro alloys so as to have a $D_{50}$ or mean particle size of 8 to 12 microns and a $D_{100}$ of up to 25 microns where substantially all particles of the ferro alloys are less than 25 microns as shown in FIG. 3. For certain application a finer distribution may be desirable. For example a $D_{50}$ of 4 to 8 microns and a $D_{100}$ of 15 microns.

Many of the processes used in the prior art have previously used a $D_{50}$ of 15 microns as illustrated by the dotted lines of FIG. 3. It has been found that by finely grinding the ferro alloy to a fine particle size in an inert atmosphere as described herein a better balance of mechanical properties may be achieved having improved sintered pore morphology. In other words the porosity is smaller and more rounded and more evenly distributed throughout the mass which enhances strength characteristics of the finished product. In particular, powder metal products are produced, which are much tougher than have been achieved heretofore.

The ferro alloy powders may be ground by a variety of means so long as the mean particle size is between 8 and 12 microns. For example, the ferro alloy powders may be ground in a ball mill, or an attritor, provided precautions are taken to prevent oxidation of the ground particles and to control the grinding to obtain the desired particle size distribution.

Figure 4:
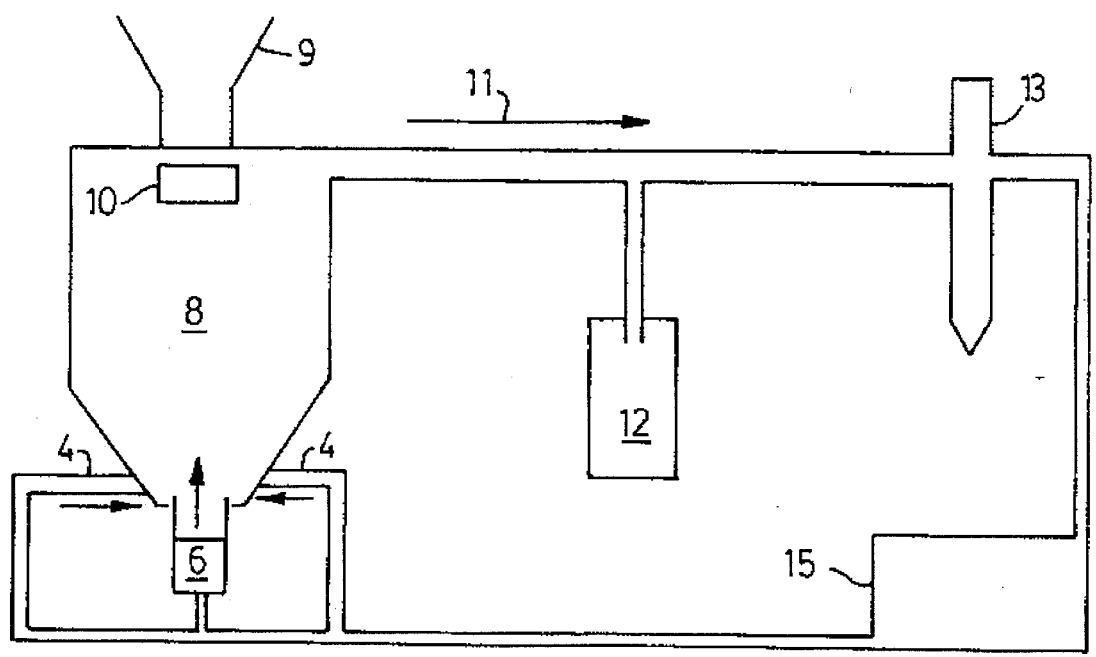
FIG. 4 is representative drawing of a jet mill utilized to produce the particle size of the ferro alloy.

Particularly good results in controlling the particle size as described herein are achieved by utilizing the jet mill illustrated in FIG. 4. The raw material feed is represented by 9, with gas flow 11, filter 12 and compressor 15. In particular, an inert gas such as cyclohexane, nitrogen or argon is introduced into the grinding chamber via nozzles 4 which fluidize and impart high energy to the particles of ferro alloys 6 upward and causes the ferro alloy particles to break up against each other. As the ferro alloy particles grind up against each other and reduce in size they are lifted higher up the chamber by the gas flow and into a classifier wheel 10 which is set at a particular RPM. The particles of ferro alloy enter the classifier wheel 10 where the ferro alloy particles which are too big are returned into the chamber 8 for further grinding while particles which are small enough namely those particles of ferro alloy having a particle size of less than 25 microns pass through the wheel 10 and collect in the collecting zone 12. The grinding of the ferro alloy material is conducted in an inert gas atmosphere as described above in order to prevent oxidization of the ferro alloy material. Accordingly, the grinding mill shown in FIG. 4 is a totally enclosed system. The jet mill which is utilized accurately controls the size of the particles which are ground and produces a distribution of ground particles which are narrowly centralized as shown in FIG. 3. The classifier wheel speed is set to obtain a $D_{50}$ of 8 to 10 microns. The speed will vary with different ferro alloys being ground.

The mechanical properties of a produced powder metal product may be accurately controlled by:

(a) selecting elemental iron powder;

(b) determining the desired properties of the sintered article and selecting:

(i) a quantity of carbon; and (ii) the ferro alloy(s) from the group of ferro manganese, ferro chromium, ferro molybdenum, and ferro vanadium and selecting the quantity of same;

(c) grinding separately the ferro alloy(s) to a mean particle size of approximately 8 to 12 microns, which grinding may take place in a jet mill as described herein;

(d) introducing a lubricant while blending the carbon and ferro alloy(s) with the elemental iron powder;

(e) pressing the mixture to form the article; and (f) subjecting the article to a high temperature sintering at a temperature of between 1,250° C. and 1,350° C. in a reducing atmosphere of, for example 90% nitrogen and 10% hydrogen.

The lubricant is added in a manner well known to those persons skilled in the an so as to assist in the binding of the powder as well as assisting in the ejecting of the product after pressing. The article is formed by pressing the mixture into shape by utilizing the appropriate pressure of, for example, 25 to 50 tonnes per square inch. The method disclosed herein utilizes high temperature sintering of 1,250 ° C. to 1,350° C. and a reducing atmosphere of, for example nitrogen and hydrogen in a 90/10% ratio, or in vacuum. Moreover, the reducing atmosphere in combination with the high sintering temperature reduces or cleans off the surface oxides allowing the particles to form good bonds and the compacted article to develop the appropriate strength. A higher temperature is utilized in order to create the low dew point necessary to reduce the oxides of manganese and chromium which are difficult to reduce. The conventional practice of sintering at 1150 ° C. does not create a sintering regime with the right combination of low enough dew point and high enough temperature to reduce the oxides of chromium, manganese, vanadium and silicon.

Secondary operations such as machining or the like may be introduced after the sintering stage. Moreover, heat treating stages may be introduced after the sintering stage.

Advantages have been realized by utilizing the invention as described herein. For example, manganese, chromium and molybdenum ferro alloys are utilized to strengthen the iron which in combination or singly are less expensive than the copper and nickel alloys which have heretofore been used in the prior art. Moreover, manganese appears to be four times more effective in strengthening iron than nickel as 1% of manganese is approximately equivalent to 4% nickel, and accordingly a cost advantage has been realized.

Furthermore sintered steels with molybdenum, chromium, manganese and vanadium are dimensionally more stable during sintering at high temperatures described herein than are iron-copper-carbon steels (ie. conventional powder metal (P/M) steels). Process control is therefore easier and more cost effective than with conventional P/M alloys.

Furthermore, the microstructure of the finished product are improved as they exhibit:

(a) well rounded pores;

(b) homogenous structure;

(c) structure having a much smaller grain size; and (d) a product that is more similar to wrought and cast steels in composition than conventional powder metal steels.

The process described herein allows one to control or tailor the materials which are desired for a particular application.

(1) sinter hardening grades (2) gas quenched grades (3) as sintered grades (4) high strength grades (5) high ductility grades The following chart provides examples of the five grades referred to above as well as the range of compositions that may be utilized in accordance with the procedure outlined herein.

| Alloy Type | Composition | | Typical Mechanical Properties | |
|---|---|---|---|---|
| | | | Ultimate Tensile Strength UTS (ksi) | Impact ft/lb |
| As Sintered | Mn: | 0.3–2.5% | 90 | 25 |
| | C: | 0.2–0.85% | | |
| Sinter Hardening | Mn: | 1.0–2.0% | 120 | 15 |
| | C: | 0.5–0.85% | | |
| | Mo: | 0–1.0% | | |
| Gas Quenched | Mn: | 0.5–2.0% | 150 | 15 |
| | Mo: | 0.5–1.5% | | |
| | C: | 0–0.6% | | |
| | Cr: | 0–1.0% | | |
| High Strength | Mn: | 0.5–2.0% | 200 | 8 |
| | Cr: | 0.5–2.0% | | |
| | Mo: | 0–1.0% | | |
| | C: | 0.1–0.6% | | |
| High Ductility | Cr: | 0.5–2.0% | 80 | 15 |
| | Mo: | 0–1.0% | | |
| | C: | 0.1–0.6% | | |

Particularly good results were achieved with the as sintered grade with 15% Mn and 0.8%C; UTS of 90 ksi and impact strength of 20 ft lbs. Other combinations of alloying are possible to produce articles with specifically tailored balance of properties such as high toughness and ware resistance.

Moreover good results were achieved with:

(a) sinter hardening grade with 1.5% Mn, 0.5% Mo, and 0.85% C;

(b) gas quenching grade (i) with 1.5% Mn, 0.5% Mo, and 0.5% C (ii) with 0.5% Cr, 1.0% Mn, and 0.5% C (c) high strength grade (i) with 1.0% Mn, 0.5% C, 0.5% Cr, 0.5% Mo (ii) with 1.5% Cr, 0.6% C, 1.0% Mn, The powder metal process described herein is the subject matter of PCT application CA 92/00388 filed Sep. 9, 1992.
Rollable Grade Moreover the method described herein may be utilized to produce a sixth grade identified as a rollable grade having the following composition.

| Rollable Grade | Cr: | 0.5–2.0% | 80 | 15 |
| --- | --- | --- | --- | --- |
| | Mo: | 0–1.0% | | |
| | C: | 0.1–0.6% | | |
| | Mn: | 0–0.6% | | |

The rollable grade and the high ductility grade is particularly suited to produce a bearing surface as described hereinafter.

Bearings

A bearing 20 having improved strength and wear characteristics can be manufactured by producing a compacted sintered blank in accordance with the high ductility grade and the rollable grade referred to above and then compressing the bearing surface to form a densified layer followed by heat treatment in a manner to be more fully particularized herein.

Figure 6:
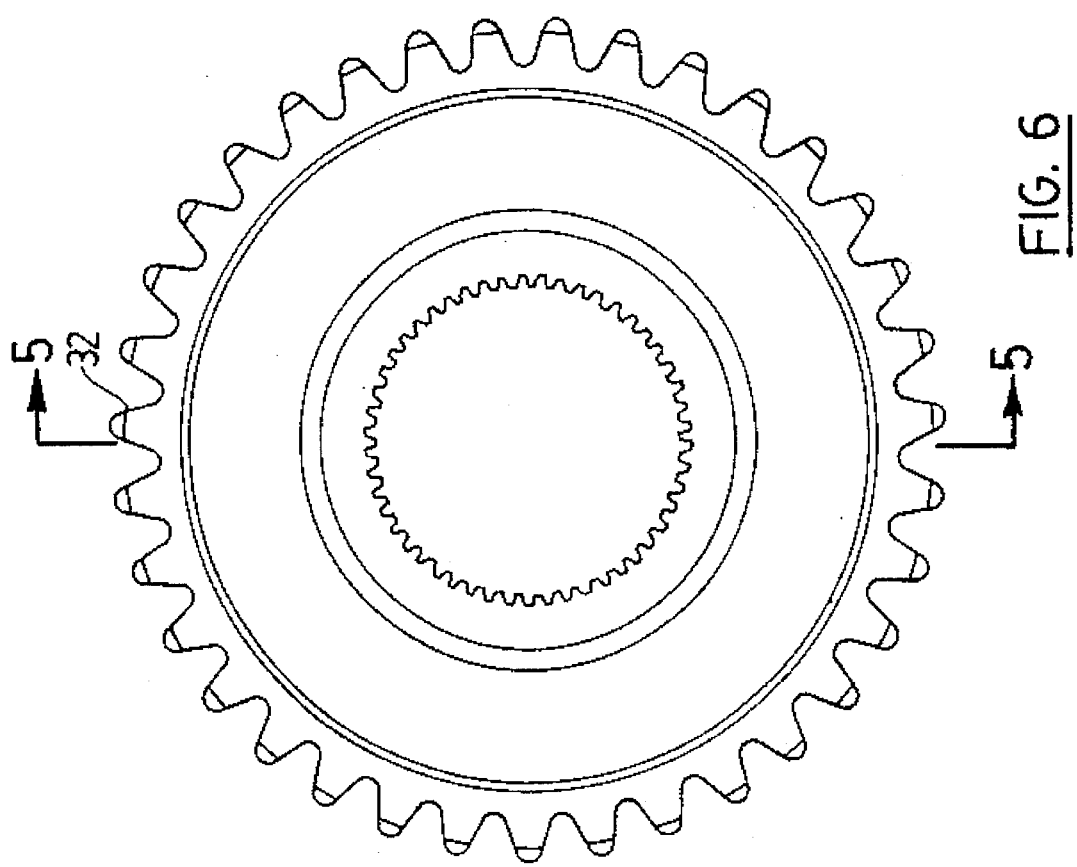
FIG. 6 illustrates a top plan view of FIG. 5.
Figure 5:
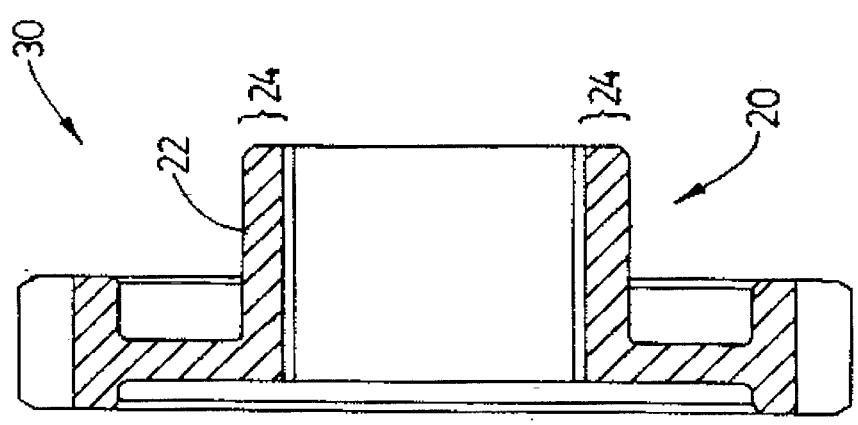
FIG. 5 illustrates a side elevational view of a part similar as an automatic transmission sprocket having a blank produced in accordance with the invention.

In particular, FIG. 5 and 6 illustrate a part which has a bearing 20. The part illustrated in FIG. 5 illustrates an automatic transmission sprocket 30 having sprocket teeth 32 and bearing 20. The bearing 20 has a bearing surface 22. The bearing 20 or bearing surface 22 comprising a bushing or solid cylindrical surface rather than a ball bearing construction.

Furthermore, the invention shall be described herein in relation to an outside diameter bushing although the teachings of the inventions herein equally apply to producing bearing or bushing surface or thrust face as well as an inside bearing surface. Accordingly, the bushing 20 of the sprocket 30 can be accurately controlled by:

(a) selecting elemental powder;

(b) selecting the high ductility properties of the sintered powder metal article by selecting:
  (i) a quantity of carbon; and
  (ii) the ferro alloys from the group of ferro chromium and ferro molybdenum;
  so as to produce a sintered article resulting in a mass of having between 0.5 to 2.0% chromium, between 0 to 1.0% molybdenum and between 0.1 to 0.6% carbon composition;

(c) grinding separately the ferro alloys to a mean particular size of approximately 8 to 12 microns;

(d) introducing a lubricant while blending the carbon and ferro alloys with the elemental iron powder;

(e) pressing the mixture to form the bushing article 20; and (f) subjecting the article to a high temperature sintering at a temperature of between 1,250° centigrade and 1,350° centigrade in a reducing atmosphere.

Another embodiment of the invention comprises:

(a) selecting elemental powder;

(b) selecting the rollable properties of the sintered powder metal article by selecting:
  (i) a quantity of carbon; and
  (ii) the ferro alloys from the group of ferro chromium, ferro molybdenum and ferro manganese
  so as to produce a sintered article resulting in a mass of having between 0.5 to 2.0% chromium, between 0 to 1.0% molybdenum, between 0 to 0.6% manganese and between 0.1 to 0.6% carbon composition;

(c) grinding separately the retro alloys to a mean particular size of approximately 8 to 12 microns;

(d) introducing a lubricant while blending the carbon and ferro alloys with the elemental iron powder;

(e) pressing the mixture to form the bushing article 20; and (f) subjecting the article to a high temperature sintering at a temperature of between 1,250° centigrade and 1,350° centigrade in a reducing atmosphere.

Thereafter, the sintered blank is cold rolled by a roller burnishing tool 50 which shall be more fully described herein.

The rolling pressure of the roll burnishing tool against the cylindrical blank produces a densified layer 24 defining the bearing.

Figure 7A:
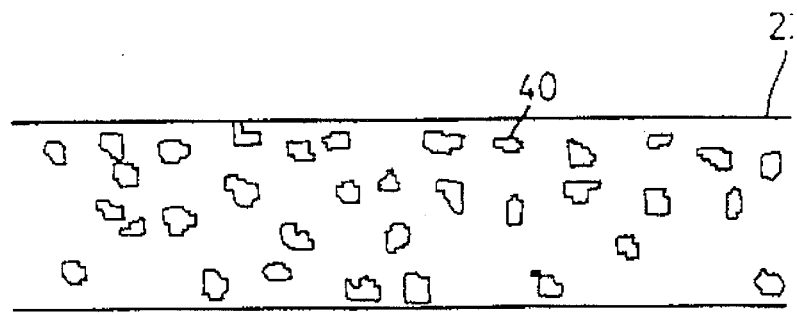
FIG. 7a is a powder metal bearing prior to rolling.
Figure 7B:
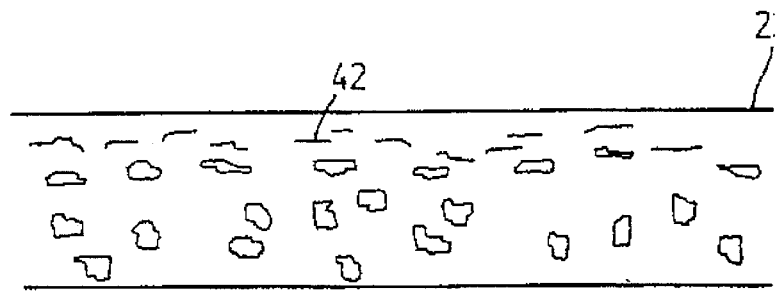
FIG. 7b is a powder metal bearing which has been roll densified.
Figure 7C:
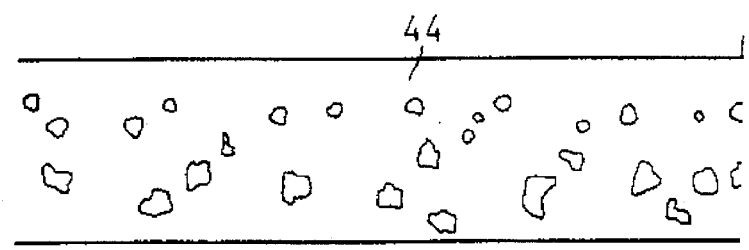
FIG. 7c is a powder metal bearing which has been roll densified and heat treated.

During compression, the pores 40 are collapsed as represented by 42 in FIG. 7 so as to approach solid density after heat treatment. The effect of heat treatment can be illustrated by the fight side of FIG. 7 which shows that the collapsed pores 42 have been substantially consolidated 44 by means of diffusion.

The thickness of the densified layer 24 depends on the composition and diameter of the bearing being produced. As a rough rule of thumb, the thickness of the densified layer 24 is approximately 4 times the diameter change in the cylindrical bearing surface 24. In particular, the bearing surface 24 will have a first larger diameter just after sintering and a smaller compacted diameter after rolling. It has been found that bearing surfaces up to 2 millimeters may be produced in accordance with the teachings of this invention.

Furthermore, the rolling and heat treating steps described herein may be utilized to produce powder metal bearings although it has been found that better results are achieved by producing a densified layer defining a bushing from a sintered blank produced from high ductility grades manufactured in accordance with the powder metal method described herein.

The rolling step described herein selectively densities the cylindrical blank to produce a bearing having a particular thickness 24. The density of the bearing 20 will progressively increase from the innermost layer 26 which may have a density of after sintering of approximately 89 to 90% to a density of a minimum of 98% at the outside bearing surface 22. In a particular example, the inner surface 26 may have a density of 7.0 g/cc while the outer bearing surface has a density of 7.7–7.8 g/cc. Accordingly, the density is at the highest at the outside bearing surface 22.

After rolling and densification as described herein, one obtains a powder metal product which may be made to final dimension.

As previously described, the heat treatment process creates a diffusion bond 44 at the collapsed pores 42. In particular, the heat treatment can be carried out at a temperature of 900° to 1,300° centigrade for a time period known to those persons skilled in the art. Moreover, heat treatment can for example, include carbonizing, quenching and tempering. Furthermore, during the high temperature exposure during heat treatment the compressed densified material is crystallized so as to produce a bearing 20 having high strength and wear characteristics. The bearing 20 produced in accordance with the one mentioned herein may be ground and polished and cut substantially as wrought steel.

Bearing steels require low intersticials and especially low oxygen contents and it has been found that the high temperature sintering described herein allows one to reach this optimum level so as to produce powder metal bearings.

Figure 8:
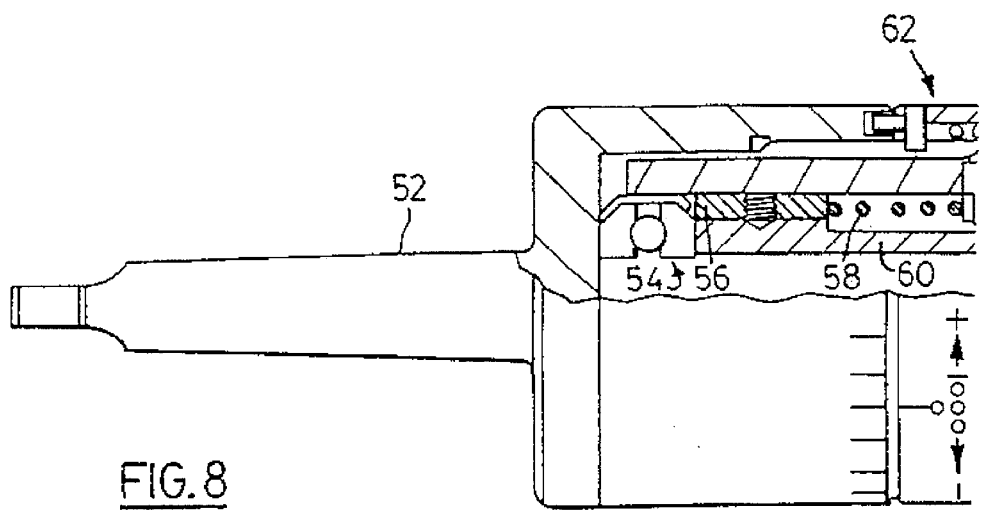
FIG. 8 is a full cross sectional view of a roller burnishing tool.

Although any number of rolling means may be utilized to compress the powder metal blank to produce the bearing surface 22, FIG. 8 shows a cross-sectional view of a roller burnishing tool 50 which is utilized to produce particularly good resulted. In particular, the roller burnishing tool 50 comprises a shank 52, a bearing 54 with cage retainer 56 and spring 58. The roller burnishing tool 50 also includes a cage 60, collar 62, body 64, with race 66 and rolls 68. The roller burnishing tool 50 described in figure 8 operates in a manner well known to those persons skilled in the art with the following changes. More particularly, the roller burnishing 50 utilized herein has been purchased from Roll-A-Matic Inc. which has a tapered roll 68 adapted to contact the outside of a sintered blank. As the burnishing tool 50 and particulary, the tapered roll 68, rolls against the blank of the sintered product, the outside surface 22 contacts the roller 68 and is progressively compressed as the sintered blank is driven progressively interiorally into the tool 50.

The roller burnishing tool 50 is purchased from Roll-A-Matic Inc. with 7 rollers. However, it has been found that particularly good results are achieved by adapted the burnishing tool 50 to present 3 rollers only and cold rolling and compressing the bearing surface 22 at a rate of approximately 20 to 30 RPM. The normal operation of the burnishing tool 50 is designed to operate with 7 rollers and at 800 RPM's. It has been found that if 7 rollers are utilized, the surface 22 tends to fall apart as not enough time is allowed for the ductile material to reconstitute itself. Accordingly, three rollers only are utilized at an RPM of 20 to 30.

Moreover, inner bearing surfaces may be produced by utilizing appropriate roller burnishing tools.

Although the preferred embodiment as well as the operation and use have been specifically described in relation to the drawings, it should be understood that variations in the preferred embodiment could be achieved by a person skilled in the trade without departing from the spirit of the invention as claimed herein. The embodiments of the invention in which an exclusive property or privileged is claimed are defined as follows.

We claim:

1. A method for producing a powder metal article having a bearing surface, said method comprising, in sequence, the steps of:
   a) blending
      carbon;
      at least one ferro alloy powder selected from the group of separate ferro alloy particles of ferro manganese, ferro chromium, ferro molybdenum; and
      a lubricant; with
      compressible iron powder to form a blended mixture;
   b) pressing said blended mixture to form said article;
   c) sintering said article;
   d) roll forming at least part of a surface of said article with rollers; said roll forming step compressing a layer of said article adjacent said surface; and
   e) heat treating said layer,
   whereby said roll forming densifies said layer, and said surface, supported by said layer, defined said bearing surface.

2. The method of claim 1 wherein:
   said ferro alloy has a mean particle size of 8 to 12 microns and substantially all of said ferro alloy has a particle size of less than 25 microns.

3. The method of claim 1 wherein:
   each of said at least one ferro alloy is selected from the group of ferro chromium and ferro molybdenum.

4. The method of claim 1 wherein:
   said sintering occurs at a temperature greater than 1250 C.; and said sintering occurs in a reducing atmosphere chosen from a) a blended Nitrogen-Hydrogen atmosphere or b) a dissociated ammonia atmosphere.

5. The method of claim 4, wherein:
   said sintering occurs at a temperature between 1250 C. and 1350 C.

6. The method of claim 2 wherein:
   said blended mixture comprises, by weight percent, from 0.5% to 2.0% Chromium, from 0 to 1.0% Molybdenum, and from 0.1% to 0.6% Carbon.

7. The method of claim 2 wherein:
   said blended mixture comprises, by weight percent, from 0.5% to 2.0% Chromium, from 0 to 1.0% Molybdenum, from 0 to 0.6% Manganese and from 0.1% to 0.6% Carbon.

8. The method as claimed in claim 2 wherein:
   said sintered article comprises a cylindrical surface and said roll forming step comprises applying rolling pressure to compress said cylindrical surface to densify said surface.

9. The method as claimed in claim 8 wherein:
   said cylindrical surface of said sintered article has a sintered, first larger diameter before said roll forming step, and a second, smaller compacted diameter after said roll forming step;
   said densified layer has a thickness; and
   said thickness is approximately four times the reduction in diameter from said first, larger diameter to said second, smaller compacted diameter.

10. The method as claimed in claim 9 wherein:
    said roll forming step is cold working step;
    said roll forming step is performed with a roller burnishing tool having seven rollers, and said method includes removing 4 of said 7 rollers and operating said tool in the range of 20 to 30 R.P.M.

11. A method of producing a bearing surface upon a sintered article, that sintered article comprising by weight percent 0.5 to 2.0% Chromium, 0 to 1.0% Molybdenum, 0 to 0.6% Manganese, 0.1 to 0.6% Carbon, and the balance of iron and trace impurities, said method comprising: applying rolling pressure against at least part of a surface of said article to form a densified layer of said article adjacent said surface; and thereafter, heat treating said densified layer.

12. The method of claim 11 wherein:
    said heat treating comprises carbonizing, quenching, and tempering.

13. The method of claim 12 wherein said heat treatment comprises heating said article to a temperature less than 1000° C.

14. A sintered powder metal article having a bearing surface, that article comprising:
    a composition, by weight percent, of 0.5 to 2.0% Chromium, 0 and 1.0% Molybdenum, 0.1 and 0.6% Carbon, with a balance of iron and trace impurities; and
    a roll-formed, cold worked, densified layer adjacent at least part of a surface of said article;
    whereby said at least part of a surface constitutes said bearing surface.

15. The sintered powder metal article of claim 14 wherein:
    said article has an as-sintered density;
    said densified layer has a density greater than said as-sintered density;
    said layer has a thickness of up to 2 millimeters;
    the density of said layer is greatest nearest said surface; and
    the density of said layer is approximately 98% of theoretical solid density at said surface.

* * * * *